(12) United States Patent
Farn et al.

(10) Patent No.: US 7,188,115 B2
(45) Date of Patent: Mar. 6, 2007

(54) PROCESSING FIXED-FORMAT DATA IN A UNICODE ENVIRONMENT

(75) Inventors: Brian Farn, Toronto (CA); Baldev Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/697,911

(22) Filed: Oct. 30, 2003

(65) Prior Publication Data

US 2004/0215647 A1    Oct. 28, 2004

(30) Foreign Application Priority Data

Apr. 24, 2003  (CA)  .................................. 2426496

(51) Int. Cl.
*G06F 17/30* (2006.01)

(52) U.S. Cl. ........................ 707/100; 706/13; 712/300
(58) Field of Classification Search ................. 706/13; 712/300; 345/467
See application file for complete search history.

(56) References Cited

U.S. PATENT DOCUMENTS

| | | | |
|---|---|---|---|
| 5,651,099 A * | 7/1997 | Konsella ...................... | 706/13 |
| 5,793,381 A * | 8/1998 | Edberg et al. ............... | 345/467 |
| 6,012,638 A * | 1/2000 | Ackley et al. ......... | 235/462.01 |
| 6,049,869 A * | 4/2000 | Pickhardt et al. ........... | 712/300 |
| 6,147,628 A | 11/2000 | Dyche ......................... | 341/60 |
| 6,166,666 A | 12/2000 | Kadyk ......................... | 341/87 |
| 6,186,406 B1 * | 2/2001 | Ackley ........................ | 235/494 |
| 6,400,287 B1 | 6/2002 | Ehrman ....................... | 341/55 |
| 6,434,625 B1 | 8/2002 | Loen ........................... | 709/236 |
| 6,622,239 B1 | 9/2003 | Wong et al. ................. | 712/227 |

(Continued)

FOREIGN PATENT DOCUMENTS

JP    9218867 A    8/1997

OTHER PUBLICATIONS

Hahn, TJ.; RD; "Method of Converting UTF-8 to/from EBCDIC Using an Escape Character", v.42, n.424, Aug. 1999, Article 42499.
Pei-Chi Wu; "A page-shift transformation format of ISO 10646", Software-Practice and Experience, vol. 32, No. 1, Jan. 2002, p. 73-82.

*Primary Examiner*—Khanh B. Pham
*Assistant Examiner*—Olubusola Oni
(74) *Attorney, Agent, or Firm*—Volel Emile; Herman Rodriguez (57) ABSTRACT

A computer system and object-oriented method and class for use with the computer system to convert data in Unicode format back and forth to data having a fixed-length format, such as EBCDIC, and to allow editing of the data and return the edited data back to its original format without loss of bytes. Conversely, the method, class, and computer system also allow the downloading of data in a fixed-length format into a Unicode environment, the fixed-length format is converted into an editable form and then reconverted back into the fixed-length format without loss of bytes. The method accommodates UTF-8, UTF-16, and UTF-32. Once the fixed-length of the data has been determined, a byte array is created and an attribute indicating whether a character is a single byte character or a double-byte character is assigned to each byte in the array. The array and subset arrays representative of fixed-length fields within the fixed-length statements may then be truncated, and/or repaired at either or both the beginning and the end, and/or right- or left-aligned to realize a version of the data that can be displayed and edited without loss of bytes. Once edited, using the assigned attributes, the byte array can be converted to code having the fixed-length format or can be translated back to Unicode.

23 Claims, 9 Drawing Sheets

FIXED LENGTH TO UNICODE - CONSTRUCTOR 2

OTHER PUBLICATIONS

Pei-Chi Wu; "Transition from national standards to Unicode: multilingual support in operating systems and programming languages", Software-Practice and Experience, 2000; 30:765-774.

Bentley, JL. et al.; "Fast Algorithms for sorting and Searching Strings", 1989.

Stan Mitchell; "Easier Console Apps in Win32", C/C++ Users Journal, Sep. 1999, p. 63-69.

Caldwell, JT.; "Unicode; A Standard International Character Code for Multilingual Information Processing" Characters and Computers, IOS Press, 1991, pp. 180-191.

* cited by examiner

PROCESSING FIXED-FORMAT DATA IN A UNICODE ENVIRONMENT

TECHNICAL FIELD

The present invention relates generally to the field of data processing and more particularly, relates to transforming data having fixed-length format and data not having fixed-length formats such that when data in one format is edited, it is correctly received in a second format.

BACKGROUND OF THE INVENTION

Since their inception, the basic components of computers are still the same: a computer processor and a memory. A computer processor is the active component of the computer system and manipulates data retrieved from the computer's memory to process tasks, programs, or processes assigned to the computer system. Computer memory stores information used by the computer and works in much the same way as the memory of a person. For example, just as humans memorize lists, poetry and events, a computer system stores words, numbers, pictures, etc. in its memories. Similarly, specialized hardware within a computer processor reads and interprets information from computer memory analogous to a human reading and interpreting printed words. And just as the arrangement of words on a page is important to human readers, the arrangement of information in the computer's memory is important to the computer system.

In the past, the choice of coding or data format was not a significant problem because computers seldom interchanged data or did so in ways that were not dependent upon data formats. But, as we all know, that universe was short-lived and computers became increasingly networked by local area networks, wide area networks, and even the Internet. The data format problem, i.e., transforming data between computers having different formats, became more severe. It seemed that operating systems, programming languages, computer architectures had preferences for a particular data format, one that was often proprietary. As long as the data stayed on the same kind of machine and the programs used the same compiler, differences in byte order, rounding, and the like caused no problem. If, however, the purpose of an application program is to analyze data from a variety of sources, such as in international trade and banking, the program must now cope with a wide variety of data formats specifying byte order, rounding, and integer sizes, etc., depending on the particular machine and compiler chosen. Even today, it is possible for source code, especially in a language like C or C++, to adapt to different data structure layouts through standard recompilation, and for many programs, that is the end of the story. Exacerbating those dilemmas of compatible machine codes was the problem of international communication and commerce wherein the barriers of human languages also had to be surmounted. This situation was more often encountered in the world of international commerce and large mainframe computers and servers which served multinational businesses until the Internet pervaded homes and electronic commerce took another giant leap. Even so, unless users all have the same computers, large multinational corporations find it still difficult to distribute and share information, especially with other multinational suppliers or customers whose choice of computers cannot be controlled and aren't always compatible with the same data format. Consequently, computer software developers devote enormous time and resources to develop multiple versions of the same software to support different computer data formats, different computer systems, and different languages.

Today data is transferred through networks using formally defined protocols. Protocol information may be defined by international standards committees and include, e.g., the ISO/OSI protocol stack, CCITT recommendations for data communications and telephony, IEEE 802 standards for local area networking and ANSI standards. Other national examples include the TCP/IP protocol stack, defined by the U.S. Department of Defense, military and commercial data processing standards such as the U.S. Navy SAFENET, XEROX Corporation XNS protocol suite, the SUN MICROSYSTEMS NFS protocol, and compression standards for HDTV and other video formats. The point is—there are numerous data transfer protocols in which byte order and other features of the data structure layout are predetermined. Data transfer between or among different transfer protocol systems compounds the problem because now data transfer must be across human languages, computer processor data storage formats, operating systems, programming languages, and now data transfer protocols. It's a complicated world.

The Unicode Standard, referred to herein as Unicode, was created by a team of computer professionals, linguists, and scholars to become a worldwide character standard that could be easily used for text encoding everywhere on the planet. Unicode follows some fundamental principles, examples of which include a universal repertoire, logical order, use of characters rather than glyphs, dynamic composition, maintenance of semantics, equivalent sequence, and convertibility. Unicode consistently encodes multilingual plain text thereby enabling the exchange of text files across human language barriers to greatly simplify the work of computer users who deal with multilingual text. Mathematicians and scientists who regularly use mathematical symbols and other technical characters, also find Unicode invaluable.

The design of Unicode is based on the simplicity and consistency of the American National Standard Code for Information Exchange (ASCII) but goes far beyond ASCII's limited ability to encode only the Latin alphabet, even though its first 156 characters are taken from ASCII's Latin-1 character set. Unicode provides the capacity to encode all of the characters used for the major written languages of the world incorporating the character sets of many existing international, national and corporate standards. Scripts include the European alphabetic scripts, Middle Eastern right-to-left scripts, and many scripts of Asia. Unicode further includes punctuation marks, diacritics, mathematical symbols, technical symbols, arrows, dingbats, etc. Duplicate encoding of characters is avoided by unifying characters within scripts across languages; for example, the Chinese, Japanese, and Korean (CJK) languages share many thousands of identical characters because their ideograph sets evolved from the same source, so a single code is assigned for each kanji or ideograph common to these languages. For all scripts, Unicode text is in logical order within the memory representation, corresponding to the order in which text is typed on the keyboard. Unicode has characters to specify changes in direction when scripts of different directionality are mixed, for example, Arabic and English. Unicode addresses only the encoding and semantics of text and does not check for spelling, grammar, etc.

The basic building block of all computer data is the bit, any number of which, usually a multiple of two, may comprise a byte and any number of bytes, again usually a multiple of two, may comprise a word. In some formats, a byte of data is eight bits. Four bytes or thirty-two bits of data is a word; a half-word is two bytes or sixteen bits; and a double word is eight bytes or sixty-four bits. The original goal of Unicode was to use a single 16-bit encoding to provide code points for more than 55,000 characters. Although 55,000 characters are sufficient for encoding most of the many thousands of characters used in major languages of the world, Unicode supports three encoding forms that use a common repertoire of characters but allow for encoding as many as a million more characters. In all, Unicode Version 4.0 provides codes for 85,221 characters from the world's alphabets, ideograph sets, and symbol collections.

Character encoding standards define not only the identity of each character and its numeric value, or code point, but also how this value is represented in bits. Unicode defines three Unicode transformation formats (UTFs) that allow the same data to be transmitted in a byte, word or double word oriented format, i.e. in 8, 16 or 32-bits per code unit. All three transformation formats encode the same common character repertoire and can be efficiently transformed into one another without loss of data. UTF-8 is popular for hyptertext markup language (HTML), popular for use on the world wide web and the Internet, and similar protocols can transform all Unicode characters into a variable length encoding of bytes. UTF-8 is particularly useful because its characters correspond to the familiar ASCII set and have the same byte values as ASCII so that Unicode characters transformed into UTF-8 can be used with existing software without software rewrites. UTF-16 is useful when there is a need to balance access to characters with use of storage. The characters that are most often used fit into a single 16-bit code unit and other characters are accessible via pairs of 16-bit code units. UTF-32 is popular where memory space doesn't matter, but fixed width, single code unit access to characters is desired. Each Unicode character is encoded in a single 32-bit code unit when using UTF-32.

To avoid deciding what is and is not a text element in different processes, the Unicode characters correspond to the most commonly used text elements. Each character is assigned a unique number/name that specifies it and no other. Each of these numbers is called a code point and is listed in hexadecimal form following the prefix "U." For example, the code point U+0041 is the hexadecimal number: 0041 and represents the character "A" in Unicode. Unicode retains the order of characters where possible and the characters, also called code elements, are grouped logically throughout the range of code points, called the codespace. The coding starts at U+0000 with the standard ASCII characters, and continues with Greek, Cyrillic, Hebrew, Arabic, Indic and other scripts, followed by symbols and punctuation, and continuing with Hiragana, Katakana, and Bopomofo. The unified Han ideographs are followed by the complete set of modern Hangul. Code blocks vary greatly in size; for example, the Cyrillic code block does not exceed 156 code points, while the CJK code blocks contain many thousands of code points. Towards the end of the codespace is a range of code points reserved for private use areas or user areas that have no universal meaning which may be used for characters specific to a program or by a group of users for their own purposes. Following the private user space is a range of compatibility characters that are encoded only to enable transcoding to earlier standards and old implementations, which made use of them.

Around 1965 IBM announced a new computer series, the System 360 that evolved into the System 390 and into the present zSeries. This computer introduced a new character coding set, the extended binary-coded decimal interchange code (EBCDIC), of 156 eight-bit characters based on Hollerith punched card conventions. When it turned out that this development followed a totally different encoding scheme from ASCII, where the heritage of paper tape is clearly discernible, it was already too late. IBM had invested far too much to change the design. In the course of time, even EBCDIC got national versions and now EBCDIC no longer means a single codetable. EBCDIC had been the most frequently applied character code up to the late 1970s. Only with the advent of the personal computer did ASCII use begin to increase. Yet even today, the entire world of IBM mainframe computers and large servers is still dominated by EBCDIC.

These integrated mainframe systems, sometimes referred to as legacy systems, continue to store programming language statements such as for Report Program Generator (RPG) and Distributed Data Services (DDS) in EBCDIC encoded files. Each statement within a file in EBCDIC encoded files has the same byte length. The statements of fixed length, moreover, are divided into fields of fixed length wherein each field has a predefined starting byte position. The length of each field and therefore the length of the statement is defined as the number of bytes that the field or statement occupies in physical memory.

Files encoded in EBCDIC having both fields and statements of fixed byte length may be downloaded to a workstation implementing Unicode for revision. When the file is downloaded, the file content is converted from EBCDIC to Unicode. Conversely, when the file is uploaded from the workstation to the legacy system, the file content is converted from Unicode to EBCDIC. Typically, prior art conversion methods that convert from EBCDIC to Unicode and from Unicode to EBCDIC are unaware of statements and are, therefore, unaware of the length of statements within the file. Although the same statement represented in Unicode on the workstation has the same number of characters, it may have a different byte length because the characters are represented differently. Recall that each Unicode character may have a different byte length than its EBCDIC equivalent so, for instance, a statement in Japanese in Unicode may consist of ten Unicode characters or twenty bytes; the same statement in EBCDIC may consist of four single byte characters followed by six double byte characters, for a total of sixteen bytes. If the file has not been edited on the workstation, the field lengths and statement lengths remain correct. If, however a statement in the file is altered through insertion, deletion, or replacement of characters on the workstation before the file is converted back to EBCDIC, fields and/or statement lengths may become different than the original fixed statement length resulting in invalid statements.

On the workstation, each character is displayed as one Unicode character but because a Unicode character may be the equivalent of multiple bytes, it may not be interpreted correctly in a mixed EBCDIC encoding of a legacy system. An editing program, moreover, may extract fields from a statement, modify the fields, and reassemble the individual fields to form a new statement. In today's world of graphical user interfaces, an editing program may display each field of a programming statement in a different colour. In each of these cases, the editor needs to know, based on the number of bytes in the field, which group of Unicode characters form a field.

Current Unicode string manipulation classes assume that lengths are defined as a number of Unicode characters. This assumption is wholly inadequate for the case cited above, i.e., when a statement in the file is altered through insertion, deletion, or replacement of characters on a Unicode workstation before the file is converted back to EBCDIC. Thus, the statement length may change from the original fixed statement length resulting in invalid statements. Thus, the industry requires a new Unicode string manipulation class in which lengths are defined as a number of bytes in the legacy code page encoding, and the length of fields and statements remain constant.

SUMMARY OF THE INVENTION

Thus, in order to solve the problems above and to provide a boon to the industry, what has been invented is a method of editing data having a fixed-length code, comprising the steps of: receiving a first data byte array; determining the encoding of the data byte array by determining a number of bytes in each of a plurality of fixed-length fields that comprise a fixed-length statement; determining a number of bytes in the fixed-length statement; creating a first data string from the first data byte array, given a starting byte position and the number of bytes in the fixed-length statement; assigning an attribute to each byte of the first data string; and repairing an end of the first data string. A method to repair the end of a string may comprise the steps evaluating the last byte to determine if it is a single byte character or a double byte character. If it is a single byte character, then nothing needs to be done; however, if the last byte is double byte character, then the appropriate attributes are assigned so that it can be transformed and edited correctly. Similarly, the beginning of the byte array is evaluated to determine if contains a single byte character or a double byte character, and if it contains a double byte character, appropriate attributes are assigned to preserve the integrity of the data. Just as the byte array can be evaluated and made to be a fixed-length; so also can fields within the byte array. These fixed-length fields can also be repaired and aligned as described herein.

It is also intended that the invention further include methods and objects to fix the length of the byte array by either appending spaces to the beginning of and/or to the end of and/or by truncating it. In any case, the invention further contemplates methods to align the byte array to be right- and/or left-aligned. The byte array can further be expanded using the assigned attributes for editing and/or parsing.

The fixed-format may be EBCDIC. The fixed-format may be ASCII. The other non-fixed-format may be Unicode.

It is further contemplated that the invention be a computer system, comprising: a first central processing unit (CPU) connected to a first computer memory storing data in a fixed-length format; a second CPU connected to a second computer memory storing data in a format other than the fixed-length format. The invention further includes an object-oriented class in one of either the first CPU or the second CPU, the object-oriented class comprising: a Unicode string of data; a code page encoding specification having a fixed-length field and a fixed-length statement; a byte array of the data from the Unicode string of data; a plurality of attributes, one attribute assigned to each byte of the byte array; and a plurality of methods that operate on the byte array. The methods within the object may comprise a method to get the Unicode String method and a method to get a byte array length from the code page encoding specification. There may be a first constructor method to input a Unicode string and output a byte array in the fixed-length code page encoding specification. There may be a second constructor method to create a Unicode string from a byte array. It is further envisioned that there be a method create a subset array of the byte array; and methods to truncate the byte array and/or subset array to the fixed-length; and methods to repair the beginning and/or the end of the subset array and/or byte array; and to right-align and/or left-align the subset array and/or byte array. It is intended that there also be a method to expand the Unicode string into an editable byte array.

The invention further contemplates a medium for transmission of an application to be implemented on a processing device, the application comprising the machine-implementable steps of: receiving a Unicode data string: creating a substring from the Unicode data string; the substring having a fixed-length format; assigning attributes to each byte of the Unicode data string, an attribute indicating if a Unicode character is a single byte or a double byte character; truncating the substring; repairing the beginning and/or end of the substring; and creating a expandable form of the substring.

BRIEF DESCRIPTION OF THE DRAWING

The invention will further be understood by reference to the Drawing in which.

DETAILED DESCRIPTION OF THE INVENTION

Figure 1:
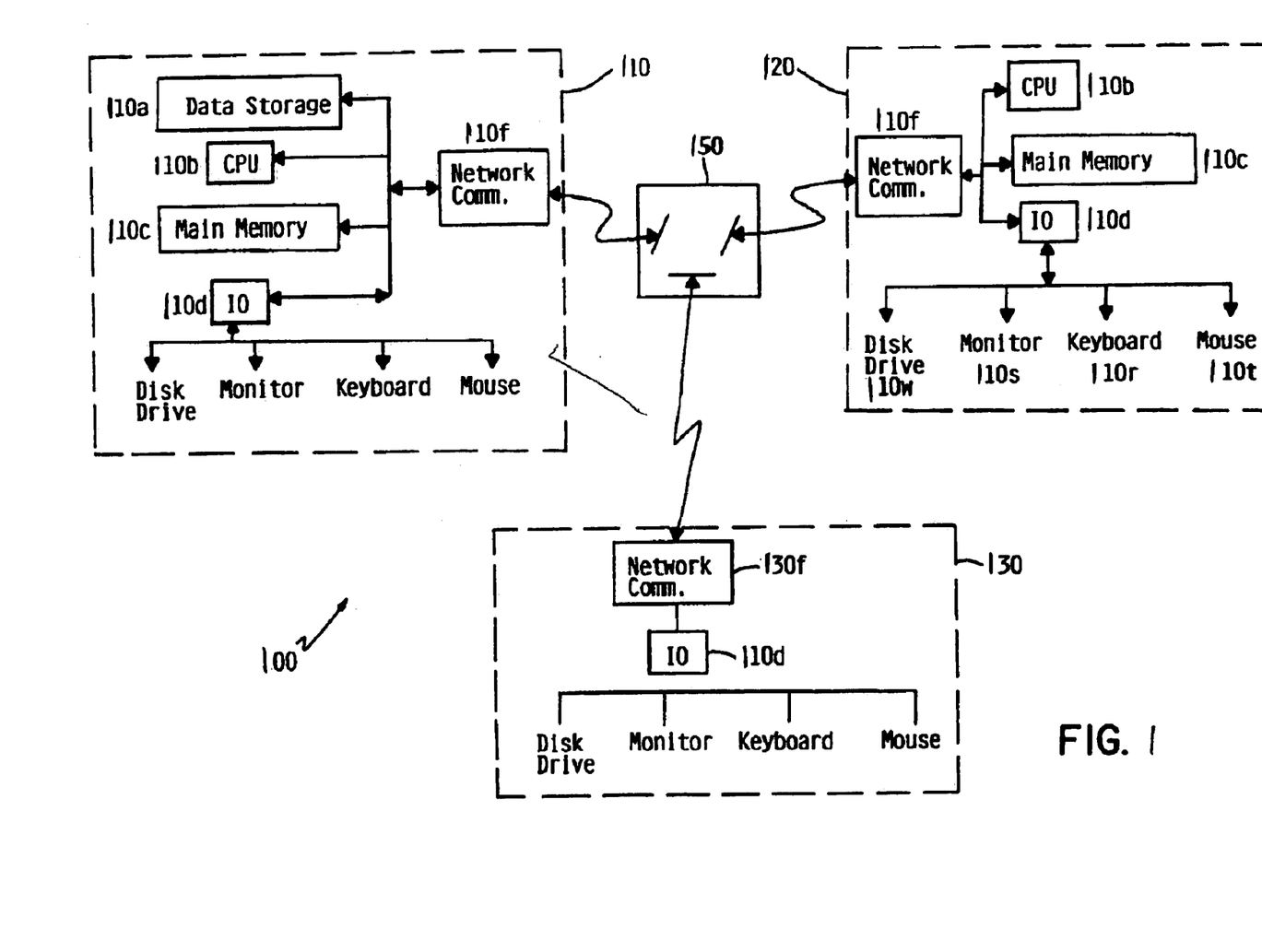
FIG. 1 is a block diagram of a networked computer system capable of implementing an embodiment of the invention.

A suitable computer network 100 which may be used in accordance with the principles of the invention is shown in the simplified block diagram of FIG. 1. The computer network may comprise one or more computers 110, 120 or a terminal 130 networked through an intercommunication system or network 150. Typically, computers 110, 120 include at least a central processing unit (CPU) 100*b*, a main memory 100*c*, input/output (I/O) interfaces 110*d*, and network communication interface 110*f*. The CPU 110*b* may be programmed in any suitable manner that effects the functions described herein. Network communication interface 110*f* connects the computer to other computers 120 or terminals 130. Terminal 130 may have only I/O devices functionally connected to it and through the network 150 terminal 130 relies on and is in communication with a CPU 110*b* of another computer 110, 120. A user may interact with source code generator according to principles of the invention via a keyboard 110*r*, monitor 110*s*, and a mouse 110*t*. A removable-media disk drive 100*w*, such as an optical or floppy disk drive is also provided, and may be used for, inter alia, storing and/or transmitting data. Although data storage 110*a* is illustrated as being integral to the computer 110 for purposes of clarity and convenience, it may be remotely located and accessed via network communication interface 110*f*. Similarly, the method described herein and/or the converted data stream may be transmitted to or received from remote computers via network communication interface 110*f*.

In data transfer among the computers 110, 120, and terminal 130 of FIG. 1 through network 150, existing data transfer protocols are typically used. For such data and in the context of the invention described herein, features of the data which are not related to the transfer protocols will be interpreted to comprise data layout formats in memory. These and other features shall be referred to as the data structure layout and may be considered as a layer of detail beyond that considered in conventional communication protocols. The data structure layout created in a suitable application on CPU 110 is logically appended to the underlying communications protocol in the CPU 110 of the transmitting computer and transferred as a whole over network 150. The communications protocol information is removed again in the receiving computer 120 or terminal 130 before the techniques described herein are invoked. It is further envisioned that one of the CPUs transmitting and/or receiving data stores data in a data structure format having fixed-length fields and fixed-length statements, herein referred to as the fixed format, such as EBCDIC and the other receiving and/or transmitting CPU stores data in a data structure format not retaining fixed-length fields and statements, such as Unicode. It will be appreciated, however, that in certain circumstances the required complexity of adapting a fixed format to one not having a fixed format can occur in the transmitting computer, in the receiving computer, or somewhere in between within th network as in a programmable hub or programmable controller, etc.

In general, the methods described herein to transform data between a fixed format and another not having a fixed format, to allow editing, and to return the edited data to a fixed format may be implemented as part of an operating system or a specific application, component, program, object, module, or sequence of instructions. The transformative and editing methods typically comprise one or more instructions that are resident at various times in various memory and storage devices in a computer, and that, when read and executed by one or more processors in a computer network, cause that computer to perform the steps necessary to execute steps or elements embodying the various aspects of the invention. While the invention has and hereinafter will be described in the context of fully functioning computers and computer systems, those skilled in the art will appreciate that the various embodiments of the invention are capable of being distributed as a program product in a variety of forms and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks, e.g., CD-ROMs, DVDs, etc., among others, and transmission type media such as digital and analog communication links. In addition, the described transformative methods and objects described hereinafter may be based upon the application for which they are implemented in a specific embodiment of the invention. It should be appreciated that any particular nomenclature that follows is used merely for convenience, and thus the invention should not be limited in its use solely to any specific application identified and/or implied by such nomenclature. The exemplary environments illustrated in FIG. 1 is not intended to limit the present invention. Indeed, those skilled in the art will recognize that other alternative hardware and/or software environments may be used without departing from the scope of the invention.

Conversion methods exist for converting between Unicode and encoded code page bytes. These are assumed to be available and are not described here. These conversion methods, however, are not designed to guarantee correct fixed field byte lengths or statement byte lengths. In accordance with features of the invention to guarantee correct fixed-length fields and fixed-length statements, a software object-oriented class called StringNL class is created. The StringNL may have the following components: a Unicode string; a given code page encoding specification; a byte array; the computed assigned attributes, one attribute for each byte of the byte array; and any methods that operate on the byte array.

Figure 2A:
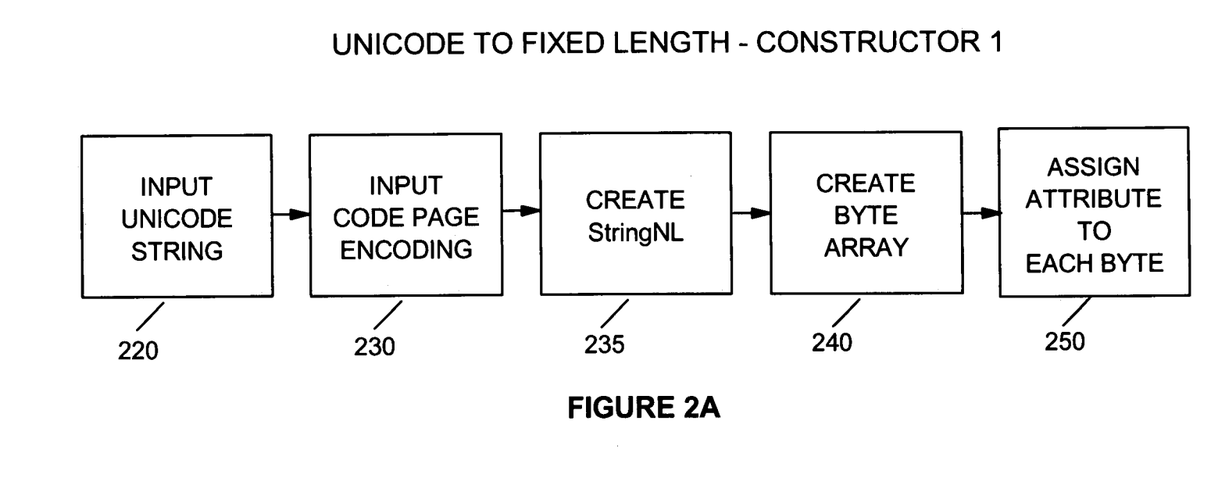
FIGS. 2*a* and 2*b* are overview blocks diagrams of methods by which data formats having fixed-length fields and statements can be exchanged with a data format not having fixed-length fields and fixed-length statements.

One of the methods of the String NL class is Constructor1. Constructor1 is shown in FIG. 2*a*. A byte array equivalent of a Unicode string is computed by using a Unicode to byte array converter which uses a given code page encoding specification. Given a Unicode string which has been input into the method at block 220 and a code page encoding specification input at block 230, a StringNL is created at block 235. Next, as in block 240, from the StringNL, a byte array is computed, and in block 250, an attribute is assigned to each byte of the byte array.

Figure 2B:
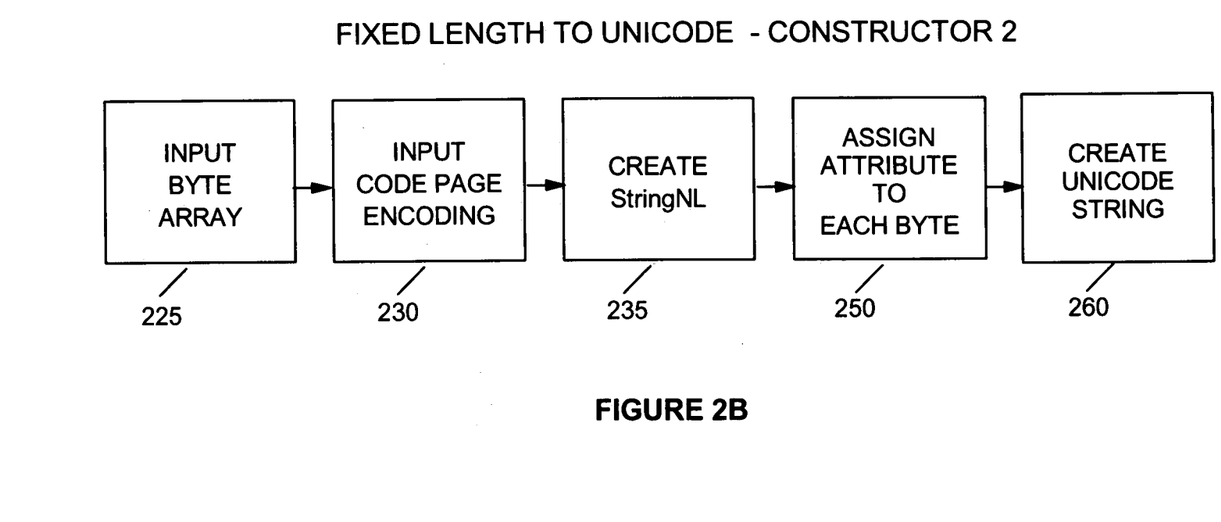

FIG. 2*b* is a simplified flow chart of another method of the String NL class, the Constructor2 method. A byte equivalent of a Unicode string can be computed using a Unicode to byte array converter which uses a given code page encoding specification. Input to Constructor2 is a byte array, as in block 225, and a code page encoding specification, as in block 230. StringNL is created in block 235 and an attribute is assigned to each byte of the byte array, as in block 250. In block 260, a Unicode string is computed using the given byte array and code page encoding specification. StringNL also contains the methods: Get the Unicode String method which simply returns a Unicode string; and Get the Byte Array Length which returns the number of bytes in the byte array.

In accordance with other aspects of the invention, given a code page encoding specification, a Unicode string is converted into an array of bytes wherein each byte is assigned an attribute, as in block 250 of both FIGS. 2*a* and 2*b*. Beginning at the leftmost byte and moving to the right, the following rules are applied. If the byte is a shift-out character, assign the byte the SO attribute; otherwise if the byte is a shift-in character, assign the byte the SI attribute; otherwise, if the byte is preceded by a byte that has been assigned a SO attribute, assign the byte the D1 attribute;

otherwise, if the byte is preceded by a byte that has been assigned a D1 attribute, assign the byte the D2 attribute; otherwise, assign the byte the S attribute. Below is a simplified table of the byte attributes:

| | |
|---|---|
| SO | Shift-out byte |
| SI | Shift-in byte |
| S | Single character byte |
| D1 | First byte of a double byte character |
| D2 | Second byte of a double byte character. |

Figure 3:
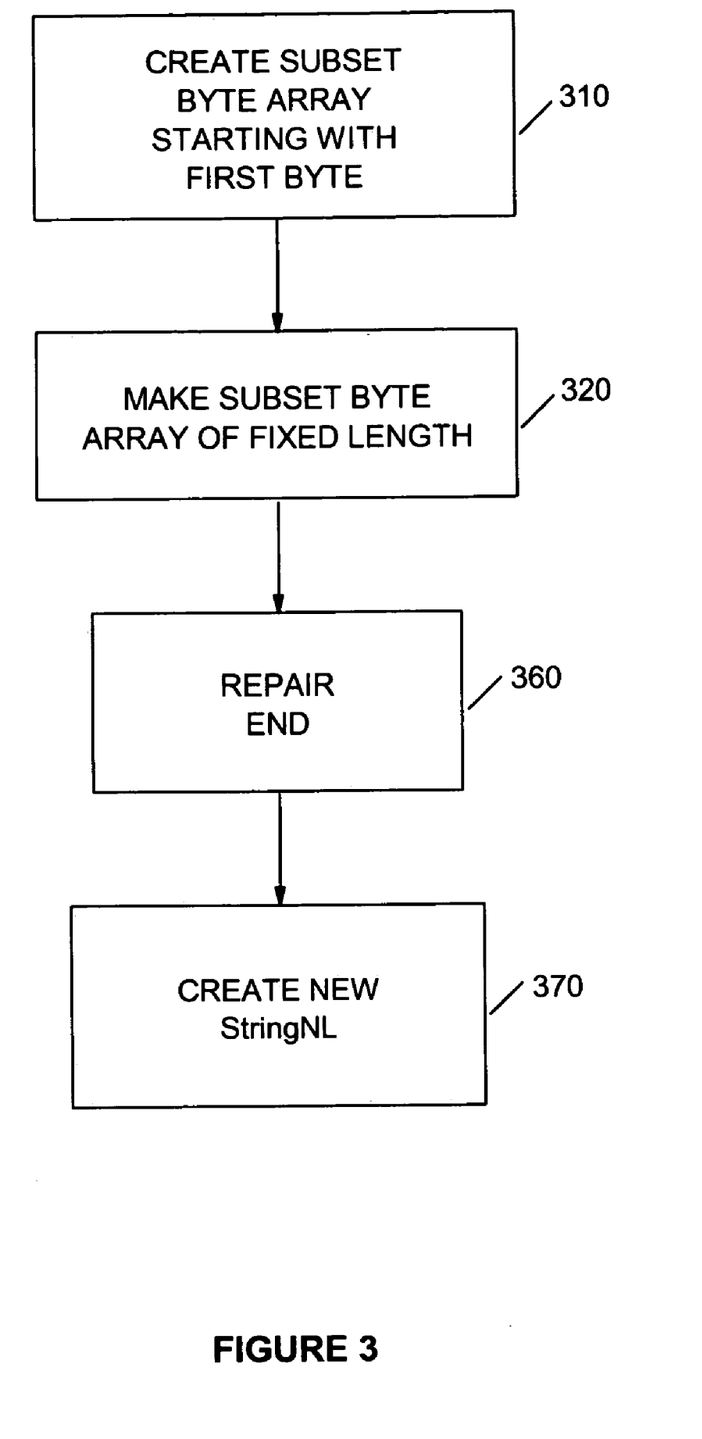
FIG. 3 is a simplified block diagram by which a byte array can be truncated in accordance with principles of the invention.

The byte array length of the fixed-length format is known. The inventors have discerned that it is useful to create a truncated version of the byte array. The process by which the array is truncated is set forth in FIG. 3. At step 310, starting with the first byte of the array, an array having the truncated length, is formed, as in step 320. The inventors have also discerned that it is necessary sometimes to repair the end of the new array as in step 360. Once the end has been repaired, a newStringNL is created of the appropriate truncated length, as in step 370.

Figure 4:
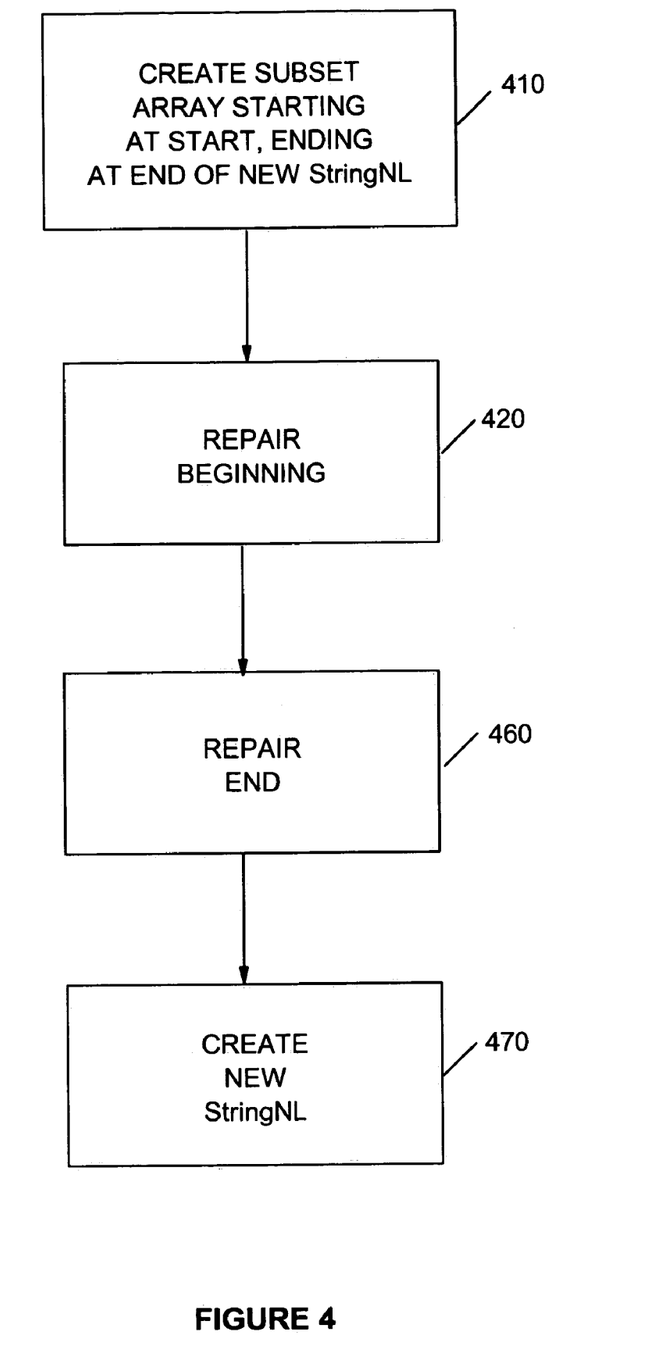
FIG. 4 is a simplified flow chart that describes how subset arrays of fixed format can be created from a data string not having a fixed format in accordance with principles of an embodiment of the invention.

FIG. 4 illustrates the steps by which a substring or a subset of the byte array can be formed from a StringNL from step 370. At step 410, starting at the requested starting byte position of the byte array of the StringNL and ending at the requested ending byte position of the byte array of the StringNL, a subset array is created. If necessary, the front of the subset array is repaired as in step 420 because the beginning may contain an invalid sequence of bytes. Similarly, at step 460, the end of the subset array is repaired. After reparation, then in step 470, a new String NL is created.

As stated above, once a subset array is created, the ending of the subset may contain an invalid sequence of bytes which needs to be repaired. The process by which this reparation is done is to call the method Repairing the End of a Byte Array as part of the object StringNL. The method will first make the end sequence of the subset byte array valid by setting the value of the second last byte to shift-out, assigning the attribute of the second last byte to SO, and removing the last byte of the byte array if the assigned attribute of the last byte is D2, as in the process shown in the simplified flow chart of FIG. 5. If the ending of the byte array is to be repaired, as in block 520, the process interrogates the last byte of the array to determine if the attribute of the last byte is D2, i.e., is the last byte of the array the second byte of a double-byte character? If yes, then at block 524, the value and the attribute of the second to the last byte is set to SO, and the last byte is removed. If, however, the last byte in not D2, then the process inquires at block 528 if the last byte is D1, i.e., is the last byte the first byte of a double-byte character? If it is, the value and the attribute of the last byte is set to SO. If, however, the last byte is not D1, then it is checked to determine if it is SO, as in block 532. If so, then the last byte is removed as in block 536. If the last byte has the attribute of SI, as in block 534, then the value and attribute of the second-to-the-last byte is checked to determine if it is SO, if so, the last two bytes of the array are removed to remove any end pair of shift-out, shift-in.

Figure 5:
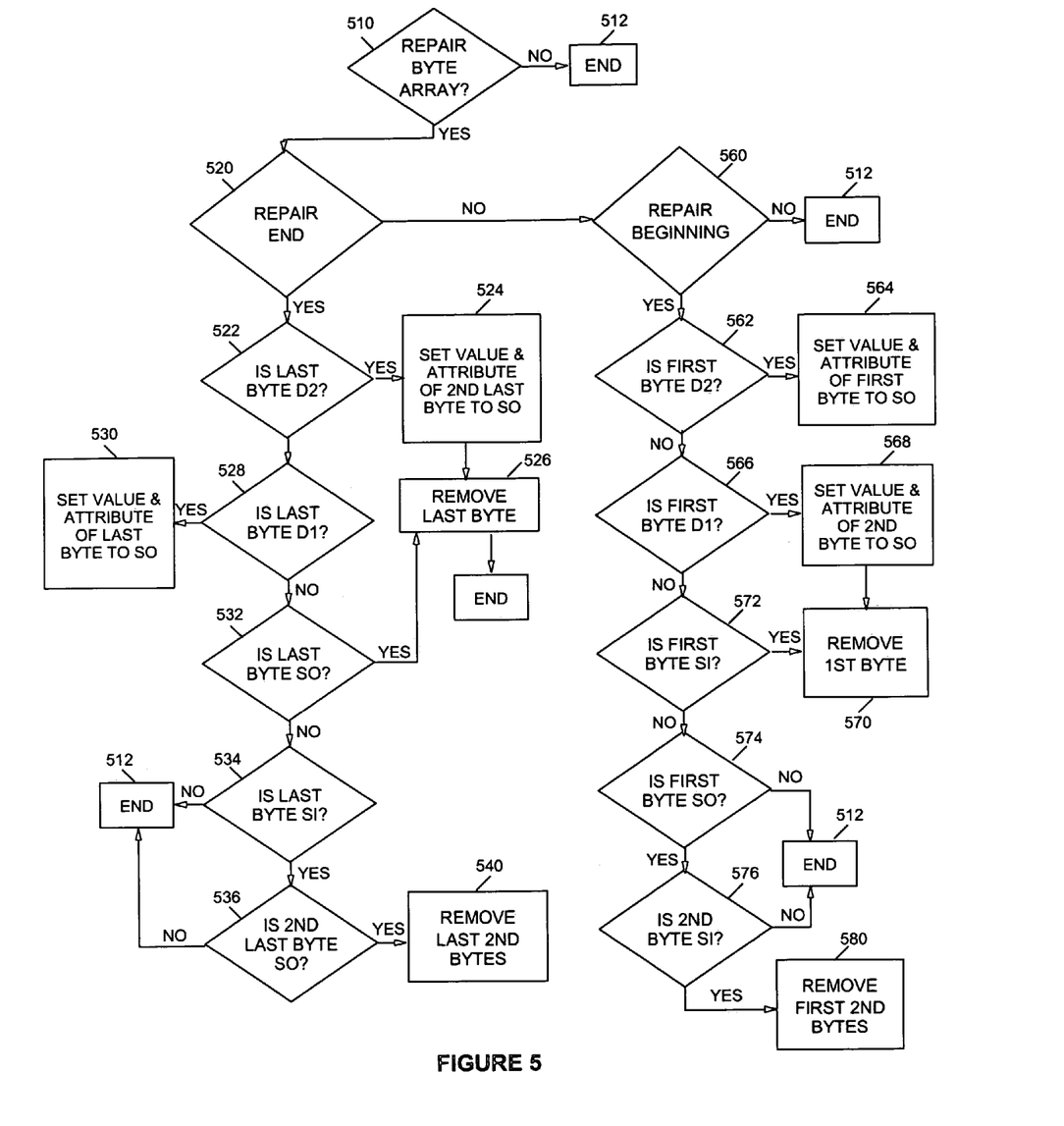
FIG. 5 is a simplified flow chart in accordance with principles of an embodiment of the invention that describes how the end and/or the beginning of an array can be repaired when creating a data string not having a fixed format from a data array having fixed-length fields and/or fixed-length statements. It is suggested that FIG. 5 be printed on the face of the patent.

Sometimes it is necessary to repair the beginning of a subset of a byte array because it may contain an invalid sequence of bytes which needs to be repaired and the method Repairing the Beginning of a Byte Array as part of the StringNL object is called. With reference to block 560, if the beginning of the subset is to be repaired, then at block 562, the process inquires if the first byte of the subset is the second byte of a double-byte character; if so, then at block 564, make the beginning sequence of the byte array valid. Set the value of the first byte to shift-out, and assign the attribute of the first byte to SO. If, however, the assigned attribute of the first byte is D1, i.e., it is the first byte of a double-byte character, then at block 568, set the value of the second byte to shift-out and assign the attribute of the second byte to SO; then remove the first byte from the byte array, as in block 570. If, however, the assigned attribute of the first byte of the subset is SI, then, as in block 570, simply remove the first byte from the subset byte array. Then if the assigned attribute of the first byte is SO, as in block 574, and the assigned attribute of the second byte is SI, as in block 576, remove any beginning pair of SO, SI (shift-out, shift-in) by removing the first two bytes from the byte array, as in block 580; otherwise end as in block 512.

Figure 6:
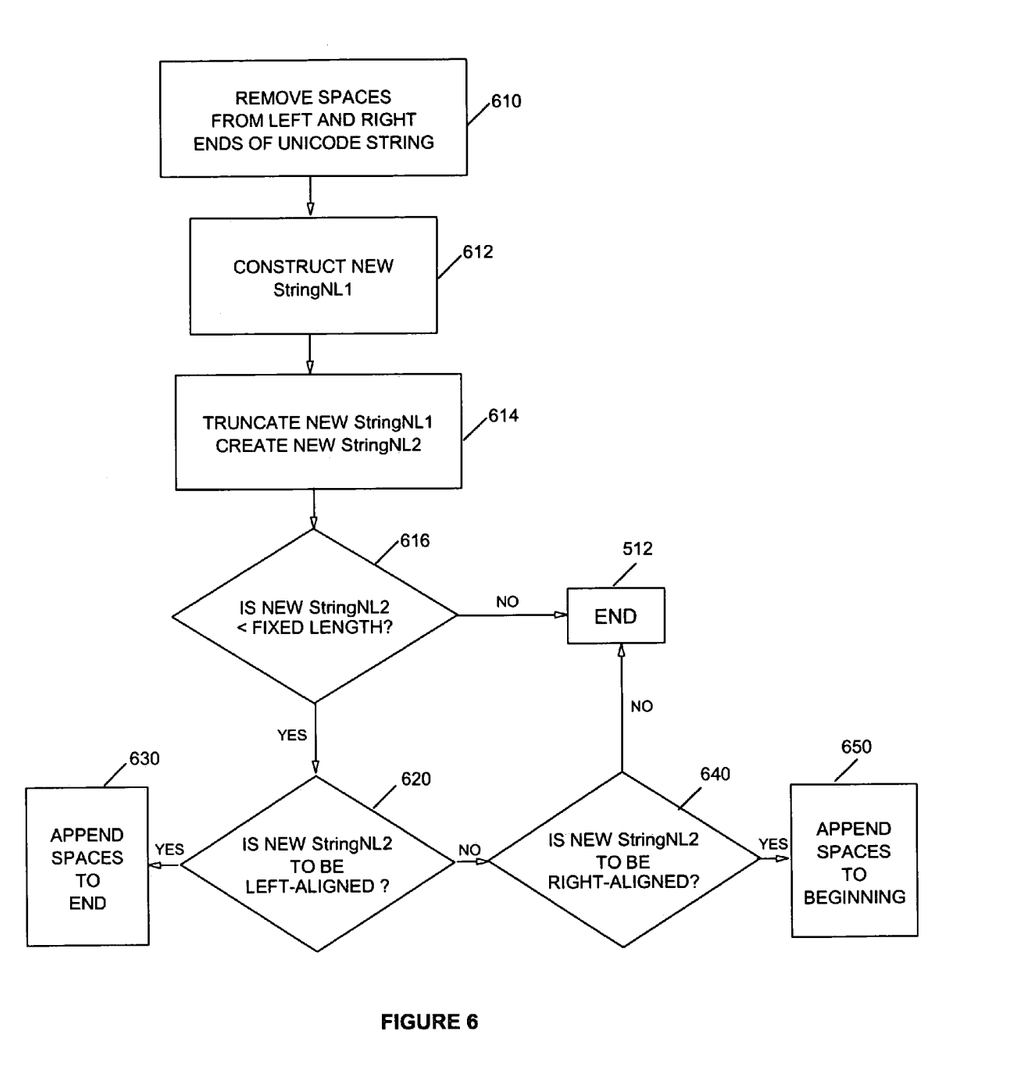
FIG. 6 is a simplified flow chart of how a data array constructed from a string can be right- and/or left-aligned.

FIG. 6 illustrates the steps in which a left-aligned array and a right-aligned array might be created in accordance with features of the invention. To create either a left- or right-aligned array, first, as in block 610, a new Unicode string, newStringNL1, whose spaces at both left and right ends have been removed to achieve a string of fixed format length, as in block 612. From newStringNL1, a second newStringNL2 is formed by truncating newStringNL1 to the requested byte array length, as in block 614, using the truncation method as described in FIG. 3. The process checks if the truncation method returned a new StringNL2 having a byte array length less than the requested byte array length at step 616. If so, then the process inquires at step 620 if the newStringNL2 is to be left-aligned. If so, then at block 630, spaces are appended to the newStringNL2. The number of spaces to append is equal to the requested byte array length minus the byte array length of newStringNL2.

If, however, the array is to be right-aligned as in step 640, then spaces are prepended to the beginning of the Unicode string of newStringNL2, as in block 650, until the byte array length is correct. The number of spaces to prepend is equal to the requested byte array length minus the byte array length of newStringNL2.

Figure 7:
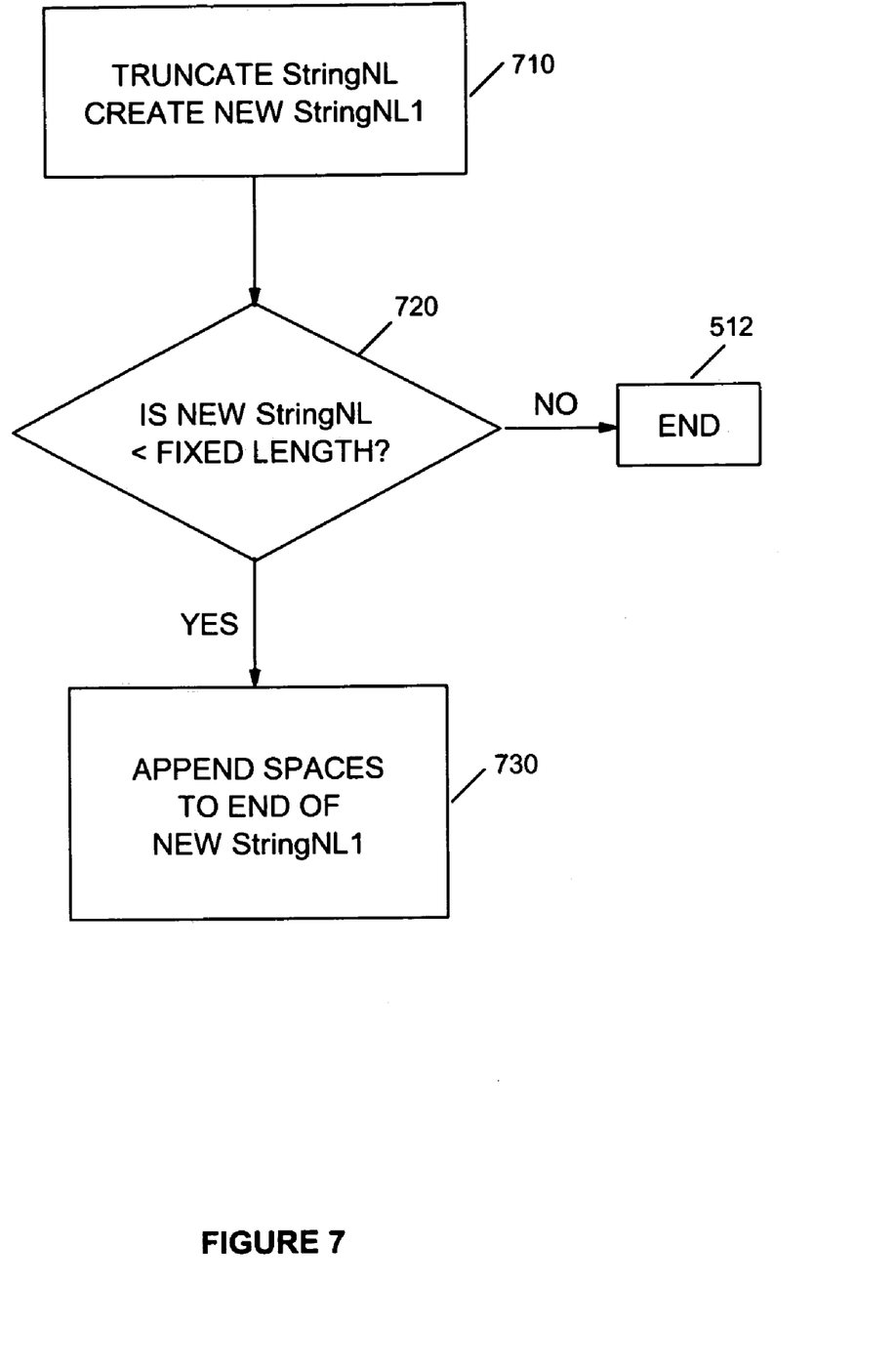
FIG. 7 is a flow chart of how an array of fixed-length fields and/or statements can be created from a truncated string of bytes in accordance with features of the invention.

Sometimes, all that is necessary is to add spaces to a Unicode string. This process is illustrated in FIG. 7. Given a Unicode string and the requested fixed format byte length, the Unicode string can be truncated to create a new-StringNL1, as in step 720. The process then checks if the newStringNL1 is of the requested byte length of the fixed format, as in block 720. If so, the process ends but if not, spaces are simply appended to the end of newStringNL1, as in block 730. The number of spaces to append is equal to the requested byte array length minus the byte array length of StringNL1.

For editing in a Unicode environment, it is useful to create an expanded form for displaying and editing; thus the class StringNL has a method that allows an editor application to display a statement wherein a displayed double byte character occupies the same number of columns as two single byte characters. Further, one Unicode character equivalent to a single byte character occupies one display column and one Unicode character equivalent to a double byte character occupies two display columns; a shift-out byte occupies one display column, and a shift-in byte occupies one display column. The method follows the steps outlined in FIG. 8. First, in step 810, a new Unicode string that is a copy of the input Unicode string is created. Then in step 812, for each shift-out and shift-in bytes in the byte array, a space is inserted in the Unicode string. In step 814, a single byte character is represented by is Unicode equivalent and in step 816, a double-byte character is represented by its Unicode equivalent. A new StringNL is constructed using the new Unicode string. The table below further illustrates the example of expanding a Unicode string in a fixed format for display and editing.

Figure 8:
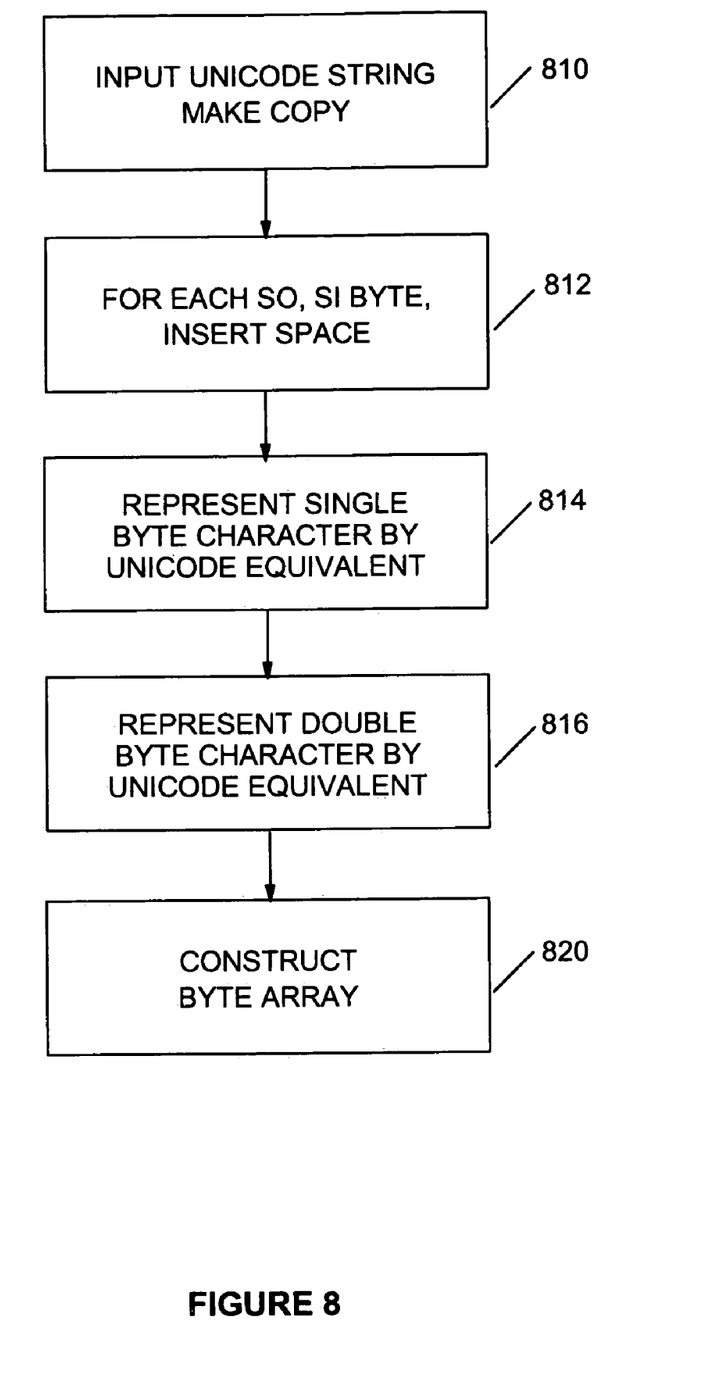
FIG. 8 is a flow chart that illustrates how an array of fixed-length format can be expanded for editing in a Unicode environment.

| Unicode Input | A | B | C | | | | D | | E |
|---|---|---|---|---|---|---|---|---|---|
| Byte Array | single byte | single byte | shift-out byte | 2X byte 1st byte | 2X byte 2nd byte | 2X byte 1st byte | 2X byte 2nd byte | shift-in byte | single byte |
| Byte Attribute | S | S | SO | D1 | D2 | D1 | D2 | SI | S |
| Unicode Output | A | B | space | C | | | D | space | E |

Figure 9:
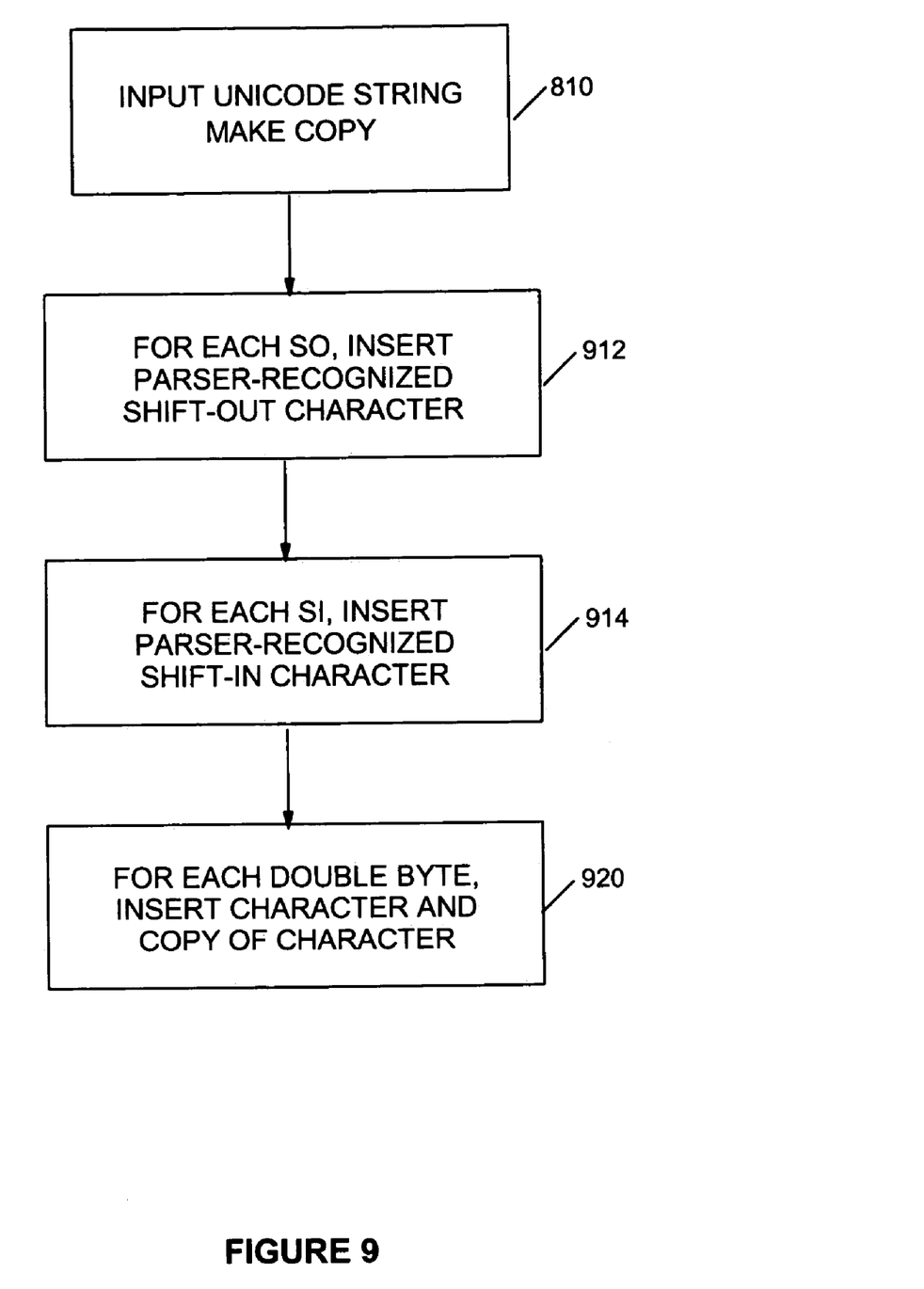
FIG. 9 is a flow chart that illustrates how an array of fixed-length format can be expanded for parsing and editing in a Unicode environment.

It is also convenient to expand a Unicode string in a parsed form, as shown in FIG. 9, to allow an editor application to parse a Unicode string as if it were an array of encoded bytes. First, as in step 810, a new Unicode string is created by copying the input Unicode string. For each shift-out byte in the byte array, insert a parser recognized shift-out character in the Unicode string, as in step 912. For each shift-in byte in the byte array, insert a parser recognized shift-in character in the Unicode string, as in step 914. For each double byte character in the Unicode string, insert a copy of the character beside the original character, as in step 920. Each single byte Unicode character will remain. Then a new StringNL is constructed.

| Unicode Input | A | B | C | | | | D | | E |
|---|---|---|---|---|---|---|---|---|---|
| Byte Array | single byte | single byte | shift-out | 2X byte 1st byte | 2X byte 2nd byte | 2X byte 1st byte | 2X byte 2nd byte | shift-in | single byte |
| Byte Attribute | S | S | SO | D1 | D2 | D1 | D2 | SI | S |
| Unicode Output | A | B | Parser shift-out | C | C | D | D | Parser shift-in | E |

Thus, it has been shown how a byte array in a fixed format having fixed-length fields in a fixed-length statement, such as in ASCII or EBCDIC, can be converted to Unicode and edited, preserving the fixed format. Furthermore, the inventors have conceived of a novel and nonobvious method to expand and parse the byte array for editing. While the examples presented herein used Unicode and EBCDIC, one of skill in the art can appreciated how the concepts can be expanded beyond those two formats. The invention can be expanded to include triple-byte word, quad-byte words, etc., between a data layout format having fixed-length fields and fixed-length statements. It is contemplated that various substitutions, alterations and/or modifications to the embodiment of the invention disclosed herein, including but not limited to those implementation options specifically noted herein, may be made to the invention without departing from the spirit and scope of the invention as defined in the appended claims:

The embodiments of the invention in which an exclusive property or privilege is claimed are defined as follows:

1. A computer-implemented method of editing data having a fixed format on a computer system that uses data having a non-fixed format such that after being edited, the data continues to have the fixed format, the method comprising the steps of:

receiving, by the computer system, a data byte array, the data byte array having the non-fixed format and including data for editing a fixed-length statement;

determining the fixed format encoding of the fixed-length statement by determining a number of bytes in each of a plurality of fixed-length fields that comprise the fixed-length statement;

determining a number of bytes in the fixed-length statement;

creating a data string from the data byte array, the data string being encoded using the determined fixed format encoding, given a starting byte position and the number of bytes in the fixed-length statement;

assigning an attribute to each byte of the data string; and editing the fixed-length statement using the data string.

2. The computer-implemented method of claim 1, further comprising the step of repairing an ending of the data string.

3. The computer-implemented method of claim 2, wherein the step of repairing the ending of the data string comprises the steps of:

determining whether or not the last byte of the data string is a second byte of a double byte character, and if the last byte of the data string is the second byte of a double byte character, setting a value of the second to the last byte to a shift-out character and changing the attribute of the second to the last byte to a shift-out character and removing the last byte;

determining, if the last byte of the data string is not a second byte of a double byte character, whether or not the last byte of the data string is a first byte of a double byte character and if the last byte of the data string is a first byte of a double byte character, then setting the value of the last byte to a shift-out character and changing the attribute of the last byte to a shift-out character;

determining, if the last byte of the data string is not a first byte of a double byte character, whether or not the last byte of the data string is a shift-out character, and if the last byte of the data string is a shift-out character, then removing the last byte of the data string;

determining, if the last byte of the data string is not a shift-out character, whether or not the last byte of the data string is a shift-in character and if the last byte of the data string is a shift-in character, determining if the second to the last byte is a shift-out character, and if the second to the last byte is a shift-out character, removing the last two bytes of the data string.

4. The computer-implemented method of claim 1, further comprising the step of repairing a beginning of the data string.

5. The computer-implemented method of claim 4, wherein the step of repairing the beginning of the data string comprises the steps of:
   determining if the first byte of the data string is a second byte of a double byte character, and if the first byte of the data string is a second byte of a double byte character, setting a value of the first byte to shift-out and changing the attribute of the first byte to a shift-out character;
   determining if the first byte of the data string is not a second byte of a double byte character, whether or not the first byte of the data string is a first byte of a double byte character and if the first byte of the data string is a first byte of a double byte character, then setting the value of the second byte to shift-out and changing the attribute of the second byte to be a shift-out character, and removing the first byte;
   determining, if the first byte of the data string is not a first byte of a double byte character, whether or not the first byte of the data string is a shift-in character, and if the first byte of the data string is a shift-in character, then removing the first byte of the data string;
   determining, if the first byte of the data string is not a shift-in character, whether or not the first byte of the data string is a shift-out character and if the first byte of the data string is a shift-out character, determining if the second byte is a shift-in character, and if so, removing the first two bytes of the data string.

6. The computer-implemented method of claim 1, further comprising the steps of:
   determining if the data string is less than the fixed-length;
   appending spaces to the end of the string so the data string is left-aligned if it is determined that the data string is less than the fixed-length.

7. The computer-implemented method of claim 1, further comprising the steps of:
   determining if the data string is less than the fixed-length;
   prepending, if it is determined that the data string is less than the fixed length, spaces to the beginning of the data string so the data string is right-aligned.

8. The computer-implemented method of claim 1, further comprising:
   expanding the data string for editing.

9. The computer-implemented method of claim 8, wherein the step of expanding the data string comprises the steps of:
   making a copy of the data string;
   inserting a space for each byte that has an attribute of shift-out;
   inserting a space for each byte that has an attribute of shift-in;
   representing each single byte character as a Unicode equivalent;
   representing each double byte character as a Unicode equivalent; and
   constructing a byte array with the above substitutions.

10. The computer-implemented method of claim 8, wherein said step of expanding the data array comprises the steps of:
   making a copy of the data string:
   inserting a parser-recognized shift-out character for each byte that has an attribute of shift-out;
   inserting a parser-recognized shift-in character for each byte that has an attribute of shift-in;
   representing each single byte character as its respective Unicode equivalent;
   representing each double byte character as its respective second Unicode equivalent and a copy of the respective second Unicode equivalent; and
   constructing a byte array with the above substitutions.

11. The computer-implemented method of claim 8, further comprising the steps of:
   returning the edited data string; and
   recreating a Unicode string from the edited data string.

12. The computer-implemented method of claim 8, further comprising the steps of:
   returning the edited data string; and
   recreating a byte array of fixed-format in EBCDIC.

13. A computer-implemented method of editing data having a fixed-length format on a computer system that uses data having a non-fixed-length format such that after being edited, the data continues to be of the fixed-length format, the method comprising the steps of:
   receiving a data byte array, the data byte array for editing a fixed-length statement of the fixed-length format and being of the non-fixed-length format;
   determining an encoding of the fixed-length statement by determining a number of bytes in each of a plurality of fixed-length fields that comprise the fixed-length statement;
   determining a number of bytes in the fixed-length statement;
   creating a data string from the data byte array, the data string being encoded using the determined encoding, given a starting byte position and the number of bytes in the fixed-length statement;
   assigning an attribute to each byte of the data string;
   creating a plurality of subsets of the data string; each of the subsets corresponding to a fixed-length field,
   repairing an end of each of the plurality of subsets if necessary by (i) determining if the last byte of the subset is a second byte of a double byte character, and if the last byte of the subset is a second byte of a double byte character, setting a value of the next to the last byte to shift-out and changing the attribute of the second to the last byte of the subset to be a shift-out character and removing the last byte; (ii) if the last byte of the subset is not a second byte of a double byte character, then determining if the last byte of the subset is a first byte of a double byte character and if the last byte of the subset is a first byte of a double byte character, then setting the value of the last byte to shift-out and changing the attribute of the last byte to a shift-out character; (iii) if the last byte of the subset is not a first byte of a double byte character, determining if the last byte of the subset is a shift-out character, and if the last byte of the subset is a shift-out character, then removing the last byte of the subset; (iv) if the last byte of the subset is not a shift-out character determining if the last byte of the subset is a shift-in character and if the last byte of the subset is a shift-in character, determining if the first byte is a shift-out character, and if the first byte is a shift-out character, removing the last two bytes of the subset;
   repairing a beginning of the each of the subsets if necessary by: (i) determining if the first byte of the subset is a second byte of a double byte character, and if the first byte of the subset is a second byte of a double byte character, setting a value of the first byte to shift-out and changing the attribute of the first byte to a shift-out character; (ii) if the first byte of the subset is not a second byte of a double byte character, determining if the first byte of the subset is a first byte of a double byte character and if the first byte of the subset is a first byte of a double byte character, then setting the value and changing the attribute of the second byte to be a shift-out character, and removing the first byte; (iii) if the first byte of the subset is not a first byte of a double byte character, determining if the first byte of the subset is a shift-in character, and if the first byte of the subset is a shift-in character, then removing the first byte of the subset; (iv) if the first byte of the subset is not a shift-in character determining if the first byte of the subset is a shift-out character and if the first byte of the subset is a shift-out character, determining if the second byte is a shift-in character, and if the second byte is a shift-in character, removing the first two bytes of the subset; (v) determining if the subset is less than the fixed-length, and if the subset is less than the fixed-length, determining if the subset is to be left-aligned or right-aligned;

appending spaces to the end of the subset if the subset is to be left-aligned;

prepending spaces to the beginning of the subset if the subset is to be right-aligned;

combining the subsets into a second data string, the second data string being of the fixed-length format;

expanding the second data string for editing; and editing the fixed-length statement using the second data string.

14. A first computer system for transferring data to a second computer system, the first computer system using a non-fixed-length data format and the second computer system using a fixed-length data format; the first computer system including at least on processor and comprising:

application means to read an original string of data not having the fixed-length format;

means to input a coding specification having the fixed-length format;

means, using the coding specification, to create a substring of the original string of data having a fixed-length in accordance with the fixed-length format;

means to truncate the substring;

means to repair the beginning and/or the end of the truncated substring if necessary;

means to right-align or left-align the repaired truncated substring;

means to expand the substring if the substring is shorter than the fixed-length;

means to edit the substring;

means to convert the edited substring to Unicode; and means to transfer the converted, edited substring to the second computer system.

15. The first computer system of claim 14, further comprising:

means to convert the edited substring to a data code format having a fixed-length format.

16. The first computer system of claim 14, further comprising:

means to convert the edited substring to a data code format not having a fixed-length format.

17. A computer program product on a computer readable storage medium for editing data having a fixed format on a computer system that uses data having a non-fixed format such that after being edited, the data continues to have the fixed format, the computer program product comprising:

code means for receiving, by the computer system, a data byte array, the data byte array having the non-fixed format and including data for editing a fixed-length statement;

code means for determining an encoding of the fixed-length statement by determining a number of bytes in each of a plurality of fixed-length fields that comprise the fixed-length statement;

code means for determining a number of bytes in the fixed-length statement;

code means for creating a data string from the data byte array, the data string being encoded using the determined encoding, given a starting byte position and the number of bytes in the fixed-length statement;

code means for assigning an attribute to each byte of the data string; and code means for editing the fixed-length statement using the data string.

18. The computer program product of claim 17, further comprising code means for repairing an ending of the data string.

19. The computer program product of claim 18, wherein the code means for repairing the end of the data string further comprises:

code means for determining whether or not the last byte of the data string is a second byte of a double byte character, and if so, code means for setting a value of a byte to shift-out, the byte being the second to the last byte of the double byte character and changing the attribute of the byte to a shift-out character and removing the last byte;

code means for determining, if the last byte is not a second byte of a double byte character, whether or not the last byte of the data string is a first byte of a double byte character and if so, code means for setting the value of the last byte to a shift-out character and for changing the attribute of the last byte to a shift-out character;

code means for determining, if the last byte of the data string is not a first byte of a double byte character, whether or not the last byte of the data string is a shift-out character, and if so, code means for removing the last byte of the data string;

code means for determining, if the last byte of the data string is not a shift-out character, whether or not the last byte of the data string is a shift-in character and if so, code means for determining if the second to the last byte is a shift-out character, and if so, code means for removing the last two bytes of the data string.

20. The computer program product of claim 19, further comprising code means for repairing a beginning of the data string.

21. The computer program product of claim 20, wherein the code means for repairing the beginning of the data string further comprises:

code means for determining whether or not the first byte of the data string is a second byte of a double byte character, and if so, code means for setting a value of the first byte to a shift-out character and for changing the attribute of the first byte to a shift-out character;

code moans for determining, if the first byte of the data string is not a second byte of a double byte character, whether or not the first byte of the data string is a first byte of a double byte character and if so, code means for setting the value of the second byte to shift-out, for changing the attribute of the second byte to a shift-out character, and for removing the first byte;

code means for determining, if the first byte of the data string is not a first byte of a double byte character, whether or not the first byte of the data string is a shift-in character, and if so, code means for removing the first byte of the data string;

code means for determining, if the first byte of the data string is not a shift-in character, whether or not the first byte of the data string is a shift-out character and if so, code means for determining whether or not the second byte is a shift-in character, and if so, code means for removing the first two bytes of the data string.

22. The computer program product of claim 17, further comprising:

code means for determining if the data string is less than the fixed-length;

code means for appending spaces to the end of the data string so the data string is left-aligned if the data string is less than the fixed-length.

23. The computer program product of claim 17, further comprising:

code means for determining if the data string is less than the fixed-length;

code means for prepending, if it is determined that the data string is less than the fixed length, spaces at the beginning of the data string so the data string is right-aligned.

* * * * *